United States Patent
Pang (10) Patent No.: US 11,120,604 B2
(45) Date of Patent: Sep. 14, 2021

(54) IMAGE PROCESSING METHOD, APPARATUS, AND STORAGE MEDIUM

(71) Applicant: BEIJING XIAOMI MOBILE SOFTWARE CO., LTD., Beijing (CN)

(72) Inventor: Yunping Pang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 30 days.

(21) Appl. No.: 16/693,225

(22) Filed: Nov. 23, 2019

(65) Prior Publication Data
US 2021/0027517 A1    Jan. 28, 2021

(30) Foreign Application Priority Data
Jul. 26, 2019 (CN) .......................... 201910682513.8

(51) Int. Cl.
G06T 15/02 (2011.01)
G06K 9/62 (2006.01)
H04M 1/725 (2021.01)

(52) U.S. Cl.
CPC .......... G06T 15/02 (2013.01); G06K 9/6215 (2013.01); G06K 9/6232 (2013.01); H04M 1/725 (2013.01)

(58) Field of Classification Search
None
See application file for complete search history.

(56) References Cited

U.S. PATENT DOCUMENTS

| 2018/0144509 | A1 | 5/2018 | Risser |
| 2020/0286273 | A1* | 9/2020 | Chen .................. G06K 9/00281 |
| 2020/0364910 | A1* | 11/2020 | Price ..................... G06T 11/203 |

FOREIGN PATENT DOCUMENTS

| CN | 106778928 A | 5/2017 |
| CN | 107481185 A | 12/2017 |
| CN | 107808394 A | 3/2018 |
| CN | 107871162 A | 4/2018 |
| CN | 108550107 A | 9/2018 |
| CN | 108564127 A | 9/2018 |
| CN | 108961349 A | 12/2018 |
| CN | 109035318 A | 12/2018 |
| CN | 109166087 A | 1/2019 |
| CN | 109360261 A | 2/2019 |

(Continued)

OTHER PUBLICATIONS

Extended European search report of counterpart EP application No. 19216621.3 dated Mar. 18, 2020.

(Continued)

Primary Examiner — Aaron M Richer
(74) Attorney, Agent, or Firm — Syncoda LLC; Feng Ma (57) ABSTRACT

An image processing method includes: inputting an original image and a style reference image into a convolutional neural network to generate a first feature map of the original image and a second feature map of the style reference image; calculating a correction value of any pixel point in the first feature map based on the second feature map; replacing an original value of each pixel point in the first feature map with a corresponding corrected value to obtain a third feature map; and performing a deconvolution process on the third feature map to obtain a processed image. An apparatus and a storage medium are further provided.

17 Claims, 7 Drawing Sheets

(56) References Cited

FOREIGN PATENT DOCUMENTS

| CN | 109472270 A | 3/2019 |
|---|---|---|
| WO | 2018042388 A1 | 3/2018 |
| WO | 2018111786 A1 | 6/2018 |
| WO | 2018194863 A1 | 10/2018 |

OTHER PUBLICATIONS

Jiang Liao et al., "Visual Attribute Transfer Through Deep Image Analogy," ACM Transactions on Graphics, vol. 36, No. 4, Article 120. Publication date: Jul. 2017.
CN 1st Office Action in Application No. 201910682513.8, dated Mar. 9, 2021.

* cited by examiner

IMAGE PROCESSING METHOD, APPARATUS, AND STORAGE MEDIUM

CROSS-REFERENCE TO RELATED APPLICATION

This application claims priority to Chinese Patent Application No. 201910682513.8 filed on Jul. 26, 2019, the disclosure of which is hereby incorporated by reference in its entirety.

BACKGROUND

Image stylization typically refers to rendering a style of one picture to a style of another picture, and outputting a fusion of the content of one picture with the style of another picture.

SUMMARY

The present disclosure relates generally to the field of image processing, and more specifically to an image processing method, an image processing device, and a storage medium.

Various embodiments of the present disclosure provide an image processing method, an image processing device, and a storage medium.

According to a first aspect of embodiments of the present disclosure, an image processing method is provided, including:

inputting an original image and a style reference image into a convolutional neural network to generate a first feature map of the original image and a second feature map of the style reference image;

calculating a correction value for any pixel point in the first feature map based on the second feature map;

replacing an original value of each pixel point in the first feature map with a corresponding corrected value to obtain a third feature map; and performing a deconvolution process on the third feature map to obtain a processed image.

Calculating a correction value of any pixel point in the first feature map based on the second feature map includes:

obtaining an attribute parameter of a feature block, the attribute parameter including: a shape parameter, a size parameter, and a base point parameter;

taking each pixel point in the second feature map as a base point, and dividing the second feature map into M second feature blocks according to the attribute parameter, wherein M is the number of pixel points in the second feature map;

taking any pixel point in the first feature map as a target base point, and obtaining a first feature block of the first feature map according to the attribute parameter;

calculating M first Euclidean distances between the first feature block and each of the M second feature blocks, respectively;

determining a shortest second Euclidean distance among the M first Euclidean distances;

obtaining a first value of a pixel point corresponding to the target base point;

obtaining a second value of a pixel point corresponding to a base point of the second feature block corresponding to the second Euclidean distance;

calculating a weight value according to the first value and the second value; and determining the weight value as a correction value of the pixel point corresponding to the target base point.

The feature block meets at least one of the following:
the shape parameter is indicated as a square;
the base point parameter indicates that the base point is at the center of the feature block.

Calculating the weight value according to the first value and the second value includes:

let the weight value be W, the first value is P, a first weighting coefficient is $\alpha$, the second value is Q, and a second weighting coefficient is $\beta$;

then $W = P \times \alpha + Q \times \beta$, wherein $\alpha + \beta = 1$.

Before calculating the M first Euclidean distances between the first feature block and each of the M second feature blocks, respectively, the method further includes:

if the first feature block exceeds a range of the first feature map, zeroizing pixel points of the first feature block exceeding boundaries of the first feature map;

If the second feature block exceeds a range of the second feature map, zeroizing on pixel points of the second feature block exceeding boundaries of the feature map.

A size of the original image is same as a size of the style reference image.

According to a second aspect of the embodiments of the present disclosure, there is provided an image processing apparatus, including:

a processor;

a memory for storing instructions executable by the processor;

wherein the processor is configured to:

input an original image and a style reference image into a convolutional neural network to generate a first feature map of the original image and a second feature map of the style reference image;

calculate a correction value for any pixel point in the first feature map based on the second feature map;

replace an original value of each pixel point in the first feature map with a corresponding corrected value to obtain a third feature map; and perform a deconvolution process on the third feature map to obtain a processed image.

According to a third aspect of the embodiment of the present disclosure, there is provided a non-transitory computer readable storage medium, wherein when instructions in the storage medium is executed by a processor of a mobile terminal, the mobile terminal is made to perform an image processing method, including:

inputting an original image and a style reference image into a convolutional neural network to generate a first feature map of the original image and a second feature map of the style reference image;

calculating a correction value for any pixel point in the first feature map based on the second feature map;

replacing an original value of each pixel point in the first feature map with a corresponding corrected value to obtain a third feature map; and performing a deconvolution process on the third feature map to obtain a processed image.

It should be understood that the above general description and the following detailed description are merely exemplary and explanatory and should not be construed as limiting of the disclosure.

BRIEF DESCRIPTION OF THE DRAWINGS

The accompanying drawings, which are incorporated in the specification and constitute a part of the specification, show exemplary embodiments of the present disclosure. The drawings along with the specification explain the principles of the present disclosure.

DETAILED DESCRIPTION

Example embodiments will now be described more fully with reference to the accompanying drawings. However, the embodiments can be implemented in a variety of forms and should not be construed as being limited to the examples set forth herein; rather, these embodiments are provided so that this disclosure will be more complete so as to convey the idea of the exemplary embodiments to those skilled in this art. The described features, structures, or characteristics in one or more embodiments may be combined in any suitable manner.

In the process of stylizing two pictures with great visual differences, content of a style reference picture often affects the final output picture. Similarly, the style of a content picture also affects the style of the output picture, resulting in the final output picture being not ideal.

Figure 1:
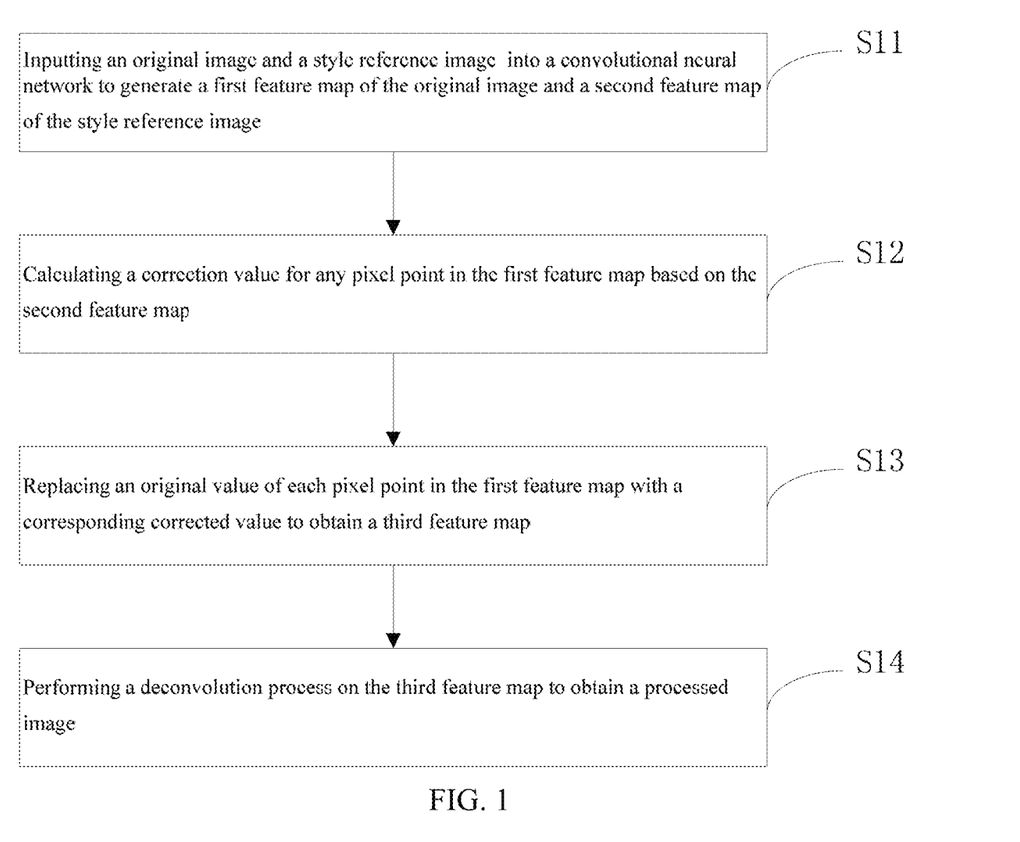
FIG. 1 is a flowchart illustrating an image processing method according to some embodiments.

FIG. 1 is a flowchart illustrating an image processing method according to some embodiments. As illustrated in FIG. 1, the image processing method can include the following steps or operations.

In step S11, an original image and a style reference image are input into a convolutional neural network to generate a first feature map of the original image and a second feature map of the style reference image.

In step S12, a correction value for any pixel point in the first feature map is calculated based on the second feature map.

In step S13, an original value of each pixel point in the first feature map is replaced with a corresponding corrected value to obtain a third feature map.

In step S14, a deconvolution process is performed on the third feature map to obtain a processed image.

In step S11, an original image and a style reference image are input into a convolutional neural network to generate a first feature map of the original image and a second feature map of the style reference image. The original image is an image on which image stylization is performed, and the style reference image is an image to which is referred when the image stylization is performed. The original image and the style reference image are input into the convolutional neural network, and the convolutional neural network performs multilayer convolution process on the original image and the style reference image to extract the features of the original image and the style reference image, and generate a first feature map of the original image and a second feature map of the style reference image.

Figure 2:
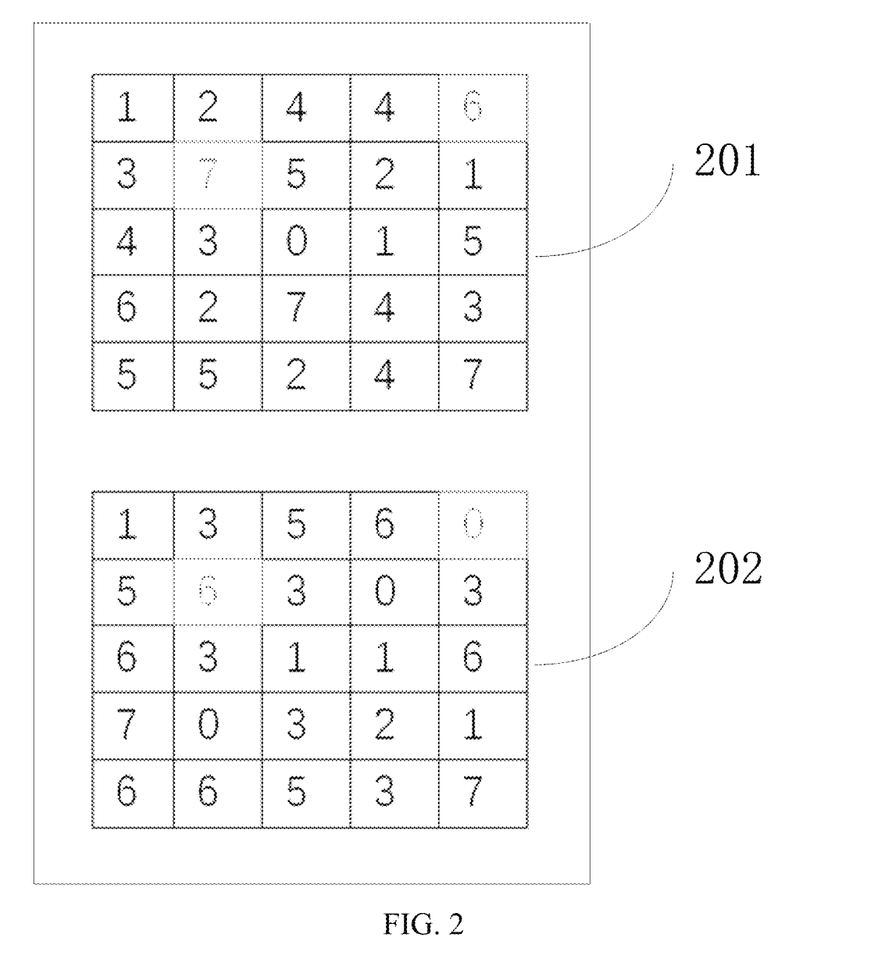
FIG. 2 illustrates a first feature map of an original image and a second feature map of a style reference image according to some embodiments.

For example, FIG. 2 illustrates a first feature map of an original image and a second feature map of a style reference image according to some embodiments. As illustrated in FIG. 2, 201 is a schematic diagram of a first feature map of the original image, and 202 is a schematic diagram of a second feature map of the style reference image. The example figures are represented in a form of a matrix. For convenience of presentation, in the present disclosure, the pixel points in the feature map are represented by squares, and the number in the square is the value of the pixel point.

In step S12, a correction value for any pixel point in the first feature map is calculated based on the second feature map. The purpose of this step is to add a style feature in the second feature map of the style reference image to each pixel point in the first feature map of the original image.

Figure 3:
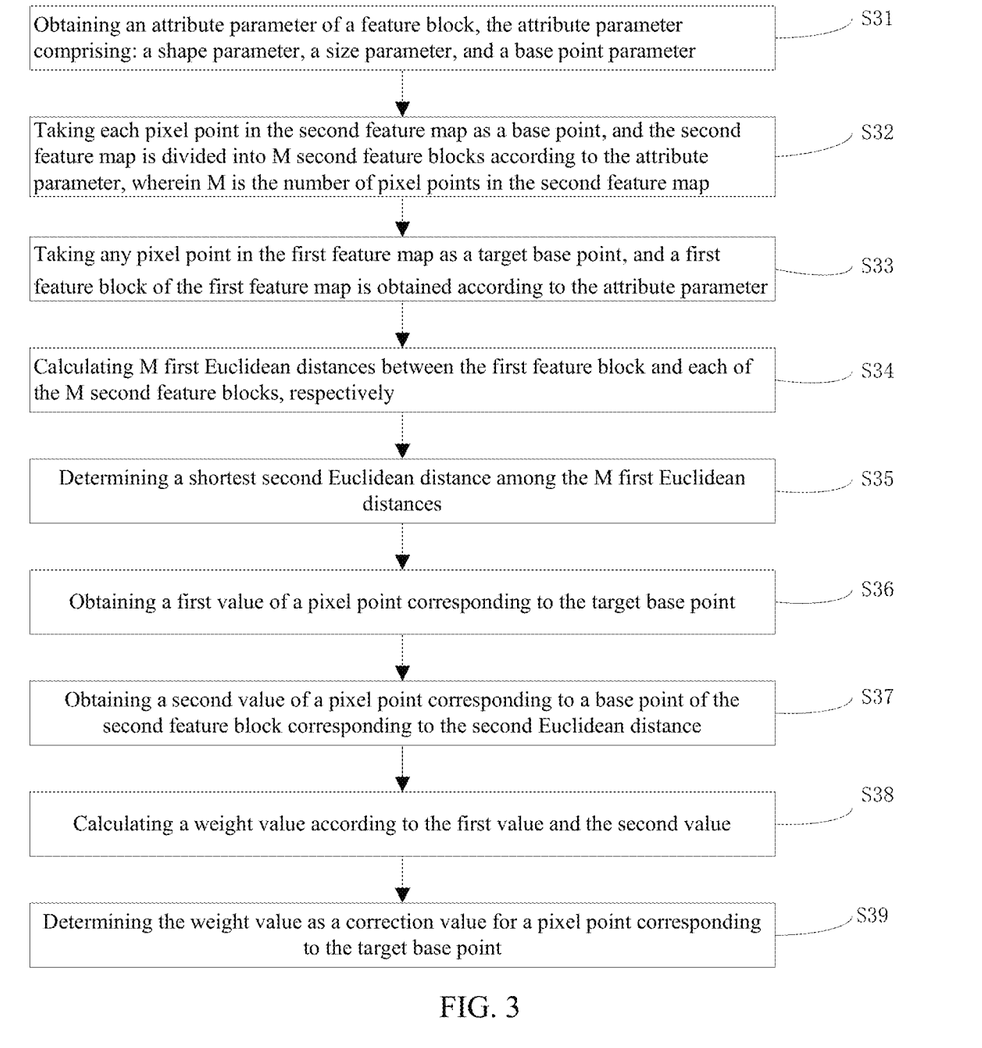
FIG. 3 is a flowchart illustrating calculating a correction value for any pixel point in a first feature map based on a second feature map according to some embodiments.

In this embodiment, FIG. 3 shows a flowchart illustrating calculating a correction value for any pixel point in a first feature map based on a second feature map according to some embodiments. The step S12 of calculating a correction value for any pixel point in the first feature map based on the second feature map illustrated in FIG. 1 can include:

In step S31, an attribute parameter of a feature block is obtained, the attribute parameter comprising: a shape parameter, a size parameter, and a base point parameter.

The shape parameter of the feature block refers to the shape of the feature block, and the shape can be a triangle, a circle, a rectangle, a square, or any irregular shape, and the size of the feature block refers to the number of pixel points of the feature block in all directions of length, width and height.

In step S32, each pixel point in the second feature map is taken as a base point, and the second feature map is divided into M second feature blocks according to the attribute parameter, wherein M is the number of pixel points in the second feature map.

The base point parameter refers to the position of the base point in the feature block. For example, for a 3×3 square feature block, the pixel point at the center of the feature block can be used as a base point, or the pixel point at the upper left corner of the feature block can be used as a base point.

Figure 4:
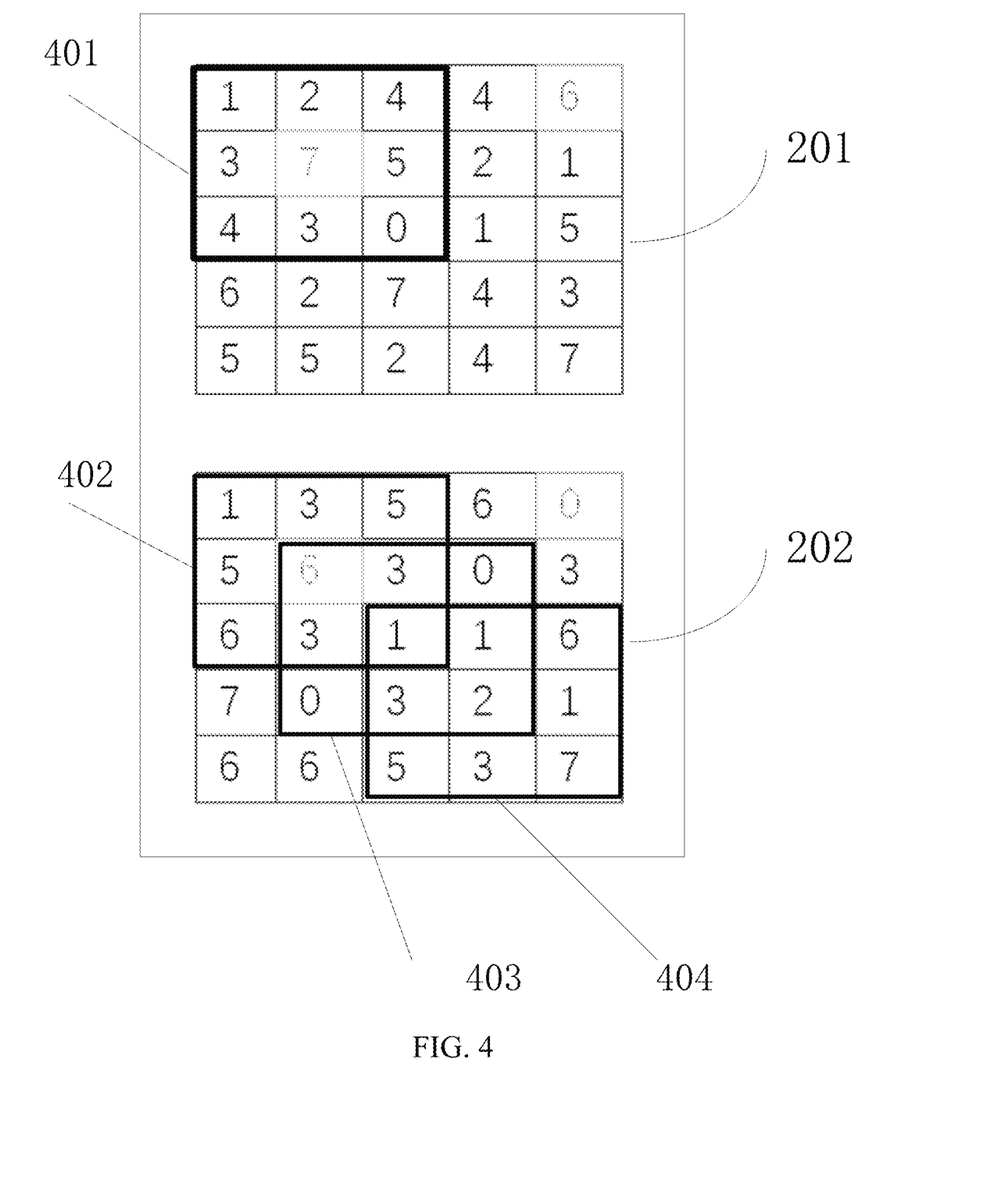
FIG. 4 is a schematic diagram illustrating division of feature blocks in a first feature map and a second feature map, according to some embodiments.

For example, FIG. 4 is a schematic diagram illustrating division of feature blocks in a first feature map and a second feature map, according to some embodiments. Taking FIG. 4 as an example, in the embodiment, the feature block shape parameter is indicated as a square, the base point is located at the center of the feature block, and the feature block has a size of 3×3 pixel points. The second feature map 202 is divided into second feature blocks of the same shape and size with each pixel point as a base point, for example, the feature block 402, the feature block 403, and the feature block 404. Because all the feature blocks cannot be shown in the schematic diagram, only three feature blocks are drawn in this embodiment, which does not mean that only three feature blocks can be divided. In fact, the feature blocks are divided by taking each pixel point as a base point, and the number of the divided feature blocks is determined by the number of the pixel points in the feature map.

In step S33, any pixel point in the first feature map is taken as a target base point, and a first feature block of the first feature map is obtained according to the attribute parameter.

As illustrated in FIG. 4, in the first feature map 201, taking the square "7" in the second row and the second column of the figure, and the pixel point is taken as the target base point, a first feature block 401 having a square shape and a size of 3×3 is obtained.

In step S34, M first Euclidean distances between the first feature block and each of the M second feature blocks are calculated, respectively.

For example, as illustrated in FIG. 4, the distances from the first feature block 401 to the M second feature blocks 402, 403, 404, . . . , are respectively calculated. Taking the calculation of the first Euclidean distance between the first feature block 401 and the second feature block 402 and between the first feature block 401 and the second feature block 404, respectively, as an example, the calculation method can comprise:

The first Euclidean distance between the first feature block 401 and the second feature block 402 is calculated by the following formula:

$$D = \sqrt{\begin{array}{c}(1-1)^2 + (2-3)^2 + (4-5)^2 + (3-5)^2 + \\ (7-6)^2 + (5-3)^2 + (4-6)^2 + (3-3)^2 + (0-1)^2\end{array}} = 4$$

The first Euclidean distance between the first feature block 401 and the second feature block 404 is calculated by the following formula:

$$D = \sqrt{\begin{array}{c}(1-1)^2 + (2-1)^2 + (4-6)^2 + (3-3)^2 + \\ (7-2)^2 + (5-1)^2 + (4-5)^2 + (3-3)^2 + (0-7)^2\end{array}} = 4\sqrt{6}$$

Referring to the above calculation method, the first Euclidean distance between the first feature block 401 and each of the second feature blocks in the second feature map is calculated, thereby obtaining M first Euclidean distances.

In step S35, a shortest second Euclidean distance among the M first Euclidean distances is determined.

For example, as illustrated in FIG. 4, if the Euclidean distance between the first feature block 401 and the second feature block 402 is the closest among all the M first Euclidean distances, the Euclidean distance between the first feature block 401 and the second feature block 402 is determined as the second Euclidean distance.

In step S36, a first value of a pixel point corresponding to the target base point is obtained.

In step S37, a second value of a pixel point corresponding to a base point of the second feature block corresponding to the second Euclidean distance is obtained.

In step S38, a weight value is calculated according to the first value and the second value.

In step S39, the weight value is determined as a correction value for a pixel point corresponding to the target base point.

For example, as illustrated in FIG. 4, the first value of the pixel point corresponding to the target base point is 7, and the second value of the pixel point corresponding to the base point of the second feature block 402 corresponding to the second Euclidean distance is 6. The weight value is calculated according to the first value and the second value. Let the weight value be W, the first value is P, a first weighting coefficient is $\alpha$, the second value is Q, and a second weighting coefficient is $\beta$; then $W = P \times \alpha + Q \times \beta$, wherein $\alpha + \beta 1$. In the present embodiment, $\alpha = 0.3$ and $\beta = 0.7$. The first value and the second value are introduced into the weighting formula: $W = 7 \times 0.3 + 6 \times 0.7 = 6.3$. The weight value 6.3 is determined as the correction value for the pixel point in the second row and the second column in the first feature map 201. According to the above embodiment, the correction values for all the pixel points in the first feature map are calculated.

Before the step 34 of calculating M first Euclidean distances between the first feature block and each of the M second feature blocks, respectively, the method further comprises:

if the first feature block exceeds a range of the first feature map, zeroizing pixel points of the first feature block exceeding boundaries of the first feature map; and if the second feature block exceeds a range of the second feature map, zeroizing pixel points of the second feature block exceeding boundaries of the feature map.

Figure 5:
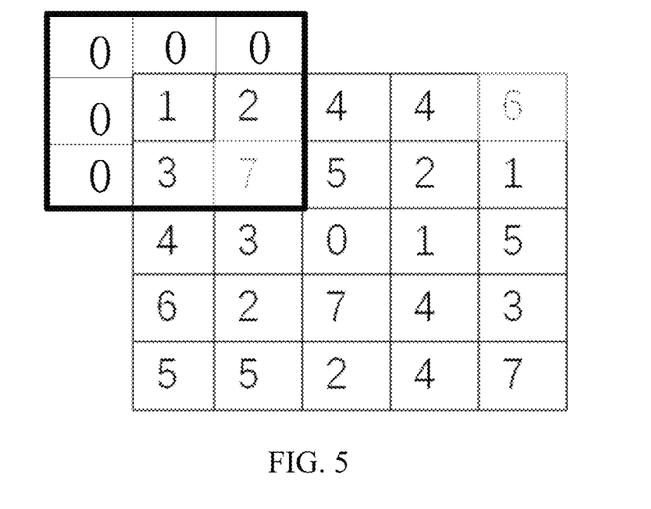
FIG. 5 is a schematic diagram illustrating zeroizing pixel points of a feature block exceeding a range of a first feature map or a second feature map.

For example, FIG. 5 is a schematic diagram illustrating zeroizing pixel points of a feature block exceeding boundaries of a first feature map or a second feature map. As illustrated in FIG. 5, when the first feature block is obtained by the pixel point in the first row and the first column in the first feature map, the first feature block may exceed the boundaries of the first feature map, and the pixel points exceeding the range of the first feature map are zeroized to calculate the shortest Euclidean distance.

Similarly, for the second feature map, the pixel points exceeding the boundaries of the second feature map are zeroized in the same manner.

In this embodiment, the feature block meets at least one of the following:

the shape parameter is indicated as a square;

the base point parameter indicates that the base point is at the center of the feature block.

Selecting a square block can balance information of the neighboring point, and the base point at the center of the feature block to balance relations between the intermediate point and the surrounding points.

In step S13, an original value of each pixel point in the first feature map is replaced with a corresponding corrected value to obtain a third feature map.

The third feature map has both the features of the original image and the features of the style reference image, and the proportion of the two features is controlled by the first weighting coefficient and the second weighting coefficient.

In step S14, a deconvolution process is performed on the third feature map to obtain a processed image. The deconvolution process is performed on the corrected feature map to generate an image with the style effect of the style reference image.

Through the deconvolution process, the features in the style reference image that have been learned are applied to the original image, so that the original image is added with the style of the style reference image while keeping the content of the original image, thereby realizing the purpose of image stylization.

In step S11 illustrated in FIG. 1, a size of the original image is same as a size of the style reference image. Before inputting the original image and the style reference image into the convolutional neural network, the original image and the style reference image are initialized to the same size, thereby ensuring that after the features are extracted by the convolutional neural network, the generated first feature map and second feature map have the same size, and that the number of times of calculating the Euclidean distance is too much or too small, which ultimately affects the image stylization effect, can be avoided.

Figure 6:
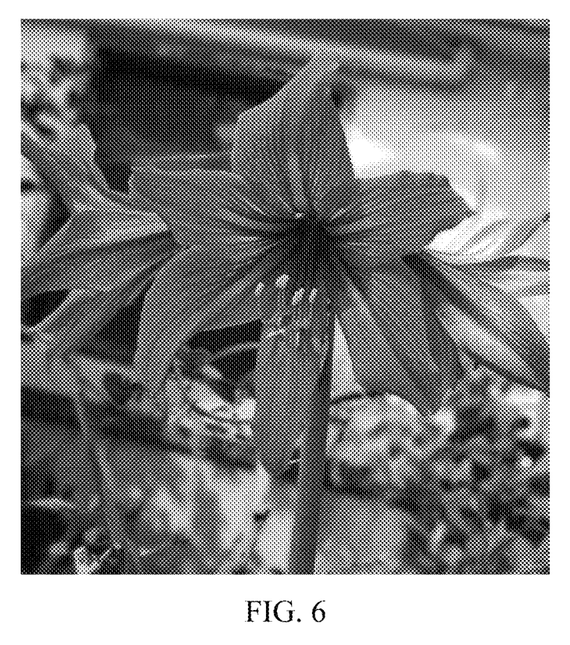
FIG. 6 is a schematic diagram illustrating an original image, according to some embodiments.
Figure 7:
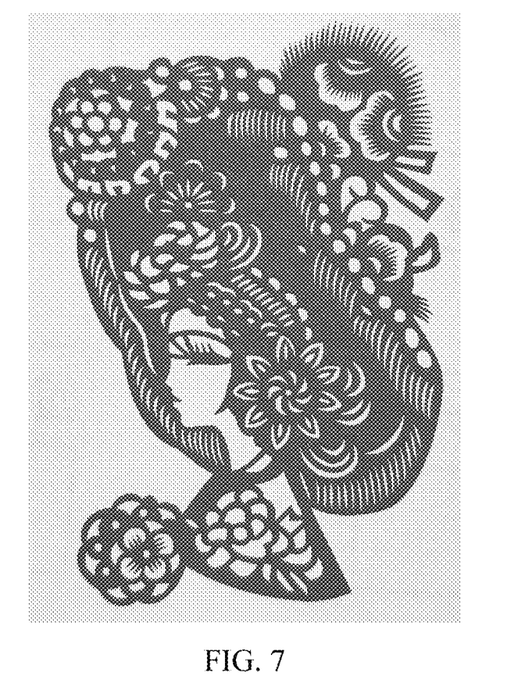
FIG. 7 is a schematic diagram illustrating a style reference image, according to some embodiments.
Figure 8:
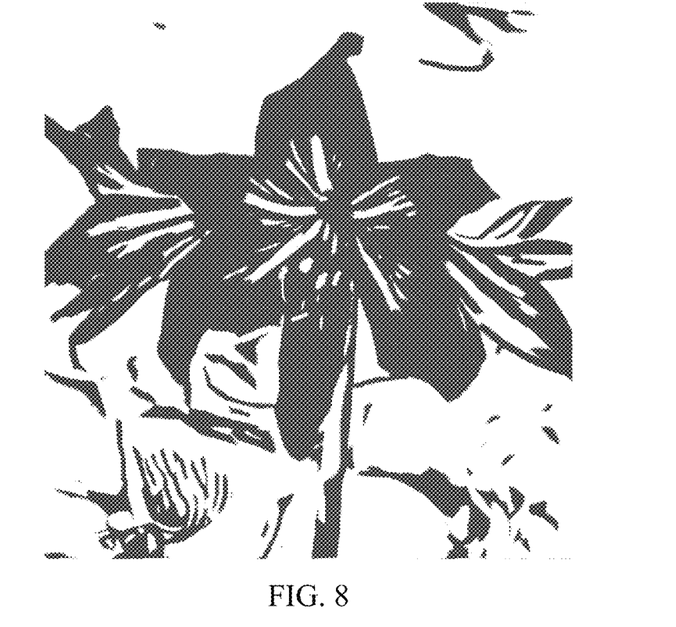
FIG. 8 is a schematic diagram illustrating an image obtained by processing an original image according to some embodiments.

For example, there is a flower image, as illustrated in FIG. 6. It is desired to process the flower image into an image with a paper-cut effect, and then a paper-cut image with a style conforming to expectations can be prepared, as illustrated in FIG. 7. The two images are initialized to form two images of the same size. The flower image is taken as an original image and the paper-cut image is taken as a style reference image, and then the two images are input into the convolutional neural network to extract the features of the two images respectively, and generate the first feature map of the original image and the second feature map of the style reference image, similar to 201 and 202 illustrated in FIG. 2. By using the method illustrated in the present disclosure, the correction value is calculated for each pixel point in the first feature map 201 based on the second feature map, and the value of each point in the first feature map is replaced with the correction value corresponding to the pixel point to generate the corrected feature map. As such, in the corrected feature map, the content feature (that is, the flower in the embodiment) of the original image is retained, while the style feature (that is, the paper-cut style in the embodiment) of the style reference image is added. The deconvolution process is performed on the corrected feature map to obtain a paper-cut style flower image, as illustrated in FIG. 8.

Figure 9:
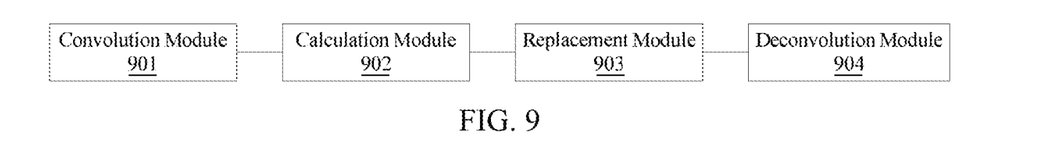
FIG. 9 is a block diagram illustrating an image processing device according to some embodiments.

FIG. 9 is a block diagram illustrating an image processing device according to some embodiments. Referring to FIG. 9, the device comprises a convolution module 901, a calculation module 902, a replacement module 903, and a deconvolution module 904.

The convolution module 901 is configured to input an original image and a style reference image into a convolutional neural network to generate a first feature map of the original image and a second feature map of the style reference image.

The calculation module 902 is configured to calculate a correction value for any pixel point in the first feature map based on the second feature map.

The replacement module 903 is configured to replace an original value of each pixel point in the first feature map with a corresponding corrected value to obtain a third feature map.

The deconvolution module 904 is configured to perform a deconvolution process on the third feature map to obtain a processed image.

Calculating, by the calculation module 902, a correction value for any pixel point in the first feature map based on the second feature map comprises:

obtaining an attribute parameter of a feature block, the attribute parameter comprising: a shape parameter, a size parameter, and a base point parameter;

taking each pixel point in the second feature map as a base point, and dividing the second feature map into M second feature blocks according to the attribute parameter, wherein M is the number of pixel points in the second feature map;

taking any pixel point in the first feature map as a target base point, and obtaining a first feature block of the first feature map according to the attribute parameter;

calculating M first Euclidean distances between the first feature block and each of the M second feature blocks, respectively;

determining a second Euclidean distance which is shortest among the M first Euclidean distances;

obtaining a first value of a pixel point corresponding to the target base point;

obtaining a second value of a pixel point corresponding to a base point of the second feature block corresponding to the second Euclidean distance;

calculating a weight value according to the first value and the second value; and determining the weight value as a correction value for a pixel point corresponding to the target base point.

The feature block meets at least one of the following:
the shape parameter is indicated as a square;
the base point parameter indicates that the base point is at the center of the feature block.

Calculating, by the calculation module 902, a weight value according to the first value and the second value comprises:

let the weight value be W, the first value is P, a first weighting coefficient is α, the second value is Q, and a second weighting coefficient is β;

then $W=P \times \alpha + Q \times \beta$, wherein $\alpha + \beta = 1$.

Before calculating M first Euclidean distances between the first feature block and each of the M second feature blocks, respectively, the method further comprises:

if the first feature block exceeds boundaries of the first feature map, zeroizing pixel points of the first feature block exceeding boundaries of the first feature map;

If the second feature block exceeds boundaries of the second feature map, zeroizing pixel points of the second feature block exceeding boundaries of the feature map.

The various device components, modules, circuits, portions, blocks, or units may have modular configurations, or are composed of discrete components, but nonetheless can be referred to as "modules" or "portions" in general. In other words, the "components," "modules," "circuits," "portions," "blocks," or "units" referred to herein may or may not be in modular forms.

Before the convolution process, the original image and the style reference image are initialized, so that a size of the original image is same as a size of the style reference image.

An image processing device comprising:
a processor;
a memory for storing instructions executable by the processor;
Wherein the processor is configured to:
input an original image and a style reference image into a convolutional neural network to generate a first feature map of the original image and a second feature map of the style reference image;
calculate a correction value for any pixel point in the first feature map based on the second feature map;
replace an original value of each pixel point in the first feature map with a corresponding corrected value to obtain a third feature map; and
perform a deconvolution process on the third feature map to obtain a processed image.

With regard to the apparatus in the above embodiments, the specific manner in which the respective modules perform the operations has been described in detail in the embodiment relating to the method, and will not be explained in detail herein.

Figure 10:
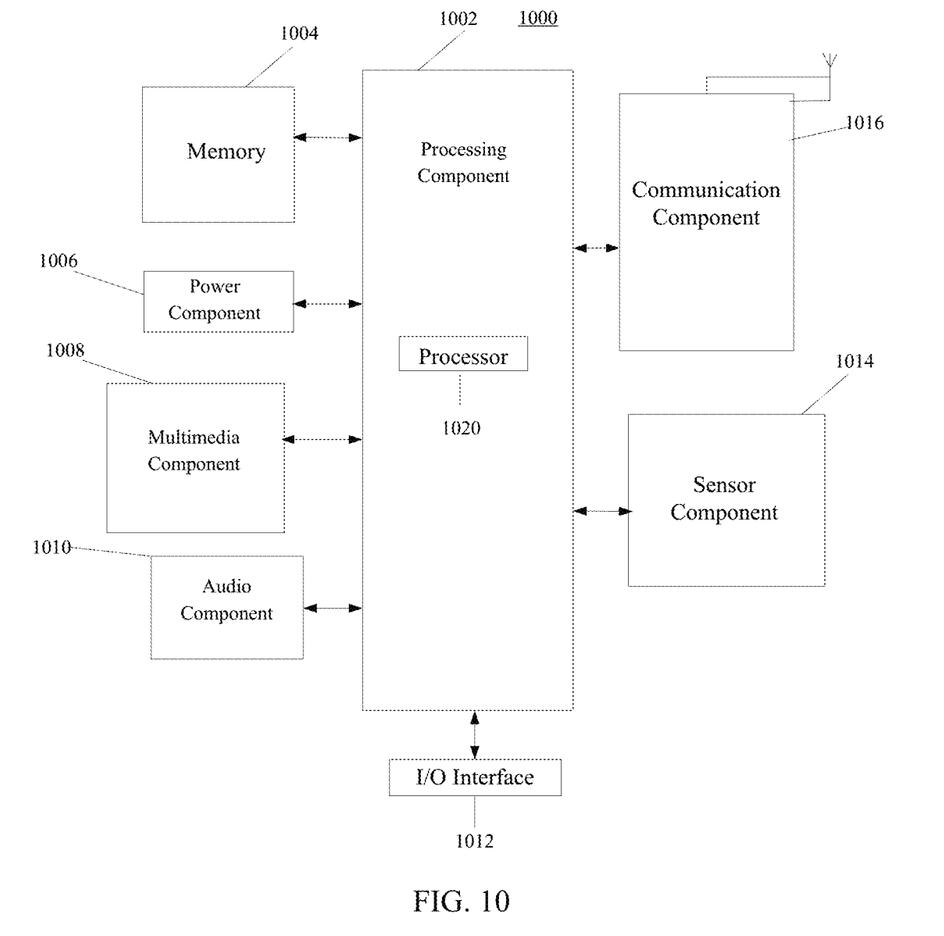
FIG. 10 is a block diagram illustrating an image processing apparatus according to some embodiments.

FIG. 10 is a block diagram of an apparatus 1000 for image processing, according to some embodiments. For example, the apparatus 1000 can be a mobile phone, a computer, a digital broadcast terminal, a messaging device, a gaming console, a tablet device, a medical device, a fitness device, a personal digital assistant, and the like.

Referring to FIG. 10, the apparatus 1000 can comprise one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls the overall operations of the apparatus 1000, such as the operations associated with display, telephone calls, data communications, camera operations, and recording operations. The processing component 1002 can comprise one or more processors 1020 to execute instructions to perform all or part of the steps in the above described methods. Moreover, the processing component 1002 can comprise one or more modules to facilitate interaction between the processing component 1002 and other components. For example, the processing component 1002 can comprise a multimedia module to facilitate interaction between the multimedia component 1008 and the processing component 1002.

The memory 1004 is configured to store various types of data to support the operation of the apparatus 1000. Examples of such data comprise instructions for any application or method operated on device 1000, such as contact data, phone book data, messages, pictures, videos, and the like. The memory 1004 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the apparatus 1000. The power component 1006 can comprise a power management system, one or more power sources, and other components associated with generation, management, and distribution of power in the device 1000.

The multimedia component 1008 comprises a screen providing an output interface between the apparatus 1000 and the user. In some embodiments, the screen can comprise a liquid crystal display (LCD) and a touch panel (TP). In some embodiments, organic light-emitting diode (OLED) or other types of displays can be employed.

If the screen comprises the touch panel, the screen can be implemented as a touch screen to receive input signals from the user. The touch panel comprises one or more touch sensors to sense touches, swipes, and gestures on the touch panel. The touch sensors not only can sense a boundary of a touch or swipe action, but also can sense duration and a pressure associated with the touch or swipe action. In some embodiments, the multimedia component 1008 comprises a front camera and/or a rear camera. When the apparatus 1000 is in an operation mode, such as a photographing mode or a video mode, the front camera and/or the rear camera can receive external multimedia data. Each of the front camera and the rear camera can be a fixed optical lens system or have focus and optical zoom capability.

The audio component 1010 is configured to output and/or input an audio signal. For example, the audio component 1010 comprises a microphone (MIC) configured to receive an external audio signal when the device 1000 is in an operation mode, such as a call mode, a recording mode, and a voice recognition mode. The received audio signal can be further stored in the memory 1004 or sent via the communication component 1016. In some embodiments, the audio component 1010 also comprises a speaker for outputting the audio signal.

The I/O interface 1012 provides an interface between the processing component 1002 and peripheral interface modules, such as a keyboard, a click wheel, buttons, and the like. These buttons can comprise, but are not limited to, a home button, a volume button, a starting button, and a locking button.

The sensor component 1014 comprises one or more sensors for providing status assessments of various aspects of the apparatus 1000. For example, the sensor component 1014 can detect an ON/OFF status of the apparatus 1000, relative positioning of components, such as the display and the keypad of the apparatus 1000. The sensor component 1014 can further detect a change in position of one component of the apparatus 1000 or the apparatus 1000, the presence or absence of user contact with the apparatus 1000, an orientation, or an acceleration/deceleration of the apparatus 1000, and a change in temperature of the apparatus 1000. The sensor component 1014 can comprise a proximity sensor configured to detect the presence of nearby objects without any physical contact. The sensor component 1014 can also comprise a light sensor, such as a CMOS or CCD image sensor, configured to use in imaging applications. In some embodiments, the sensor component 1014 can also comprise an accelerometer sensor, a gyroscope sensor, a magnetic sensor, a pressure sensor, or a temperature sensor.

The communication component 1016 is configured to facilitate wired or wireless communication between the apparatus 1000 and other apparatuses. The apparatus 1000 can access a wireless network based on a communication standard, such as Wi-Fi, 2G, 3G, 4G, or 5G, or a combination thereof. In some embodiments, the communication component 1016 receives broadcast signals or broadcast associated information from an external broadcast management system via a broadcast channel. In some embodiments, the communication component 1016 also comprises a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In some embodiments, the apparatus 1000 can be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components, to perform the above method.

In some embodiments, there is also provided a non-transitory computer-readable storage medium comprising instructions, such as a memory 1004 comprising instructions executable by the processor 1020 of the apparatus 1000 to perform the above described method. For example, the non-transitory computer readable storage medium can be a ROM, a random-access memory (RAM), a CD-ROM, a magnetic tape, a floppy disc, and an optical data storage device.

A non-transitory computer readable storage medium, when the instructions in the storage medium are executed by a processor of a mobile terminal, the mobile terminal is made to perform an image processing method, comprising:

inputting an original image and a style reference image into a convolutional neural network to generate a first feature map of the original image and a second feature map of the style reference image;

calculating a correction value for any pixel point in the first feature map based on the second feature map;

replacing an original value of each pixel point in the first feature map with a corresponding corrected value to obtain a third feature map; and performing a deconvolution process on the third feature map to obtain a processed image.

Various embodiments of the present disclosure can have one or more of the following advantages.

The first feature map of the original image and the second feature map of the style reference image are extracted by the convolutional neural network, respectively; the first feature map is made to learn the features in the second feature map to obtain a corrected third feature map; then the deconvolution process is performed on the third feature map to obtain a processed image. Through the deconvolution process, the features in the style reference image that have been learned are applied to the original image, so that the original image is added with the style of the style reference image while keeping the content of the original image, thereby realizing the purpose of image stylization.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element.

The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode) display, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the audio processing device, to perform various operations.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features may be described above as acting in certain combinations and even initially claimed as such, one or more features from a claimed combination can in some cases be excised from the combination, and the claimed combination may be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. An image processing method, comprising:
   inputting an original image and a style reference image into a convolutional neural network to generate a first feature map of the original image and a second feature map of the style reference image;
   calculating respective correction values for respective pixel points in the first feature map based on the second feature map;
   replacing original values of the respective pixel points in the first feature map with the respective correction values to obtain a third feature map; and
   performing a deconvolution process on the third feature map to obtain a processed image;
   wherein the calculating the respective correction values for the respective pixel points in the first feature map based on the second feature map comprises:
   obtaining an attribute parameter of a feature block, the attribute parameter comprising: a shape parameter, a size parameter, and a base point parameter;
   taking a respective pixel point in the second feature map as a base point, and dividing the second feature map into M second feature blocks according to the attribute parameter, wherein M is an amount of pixel points in the second feature map;
   taking a pixel point in the first feature map as a target base point, and obtaining a first feature block of the first feature map according to the attribute parameter;
   calculating M first Euclidean distances between the first feature block and each of the M second feature blocks based on values of pixel points included in the first feature block and each of the M second feature blocks, respectively;
   determining a second Euclidean distance which is shortest among the M first Euclidean distances;
   obtaining a first value of respective pixel points corresponding to the target base point;
   obtaining a second value of respective pixel points corresponding to a base point of one of the M second feature blocks corresponding to the second Euclidean distance;
   calculating a weight value according to the first value and the second value; and
   determining the weight value as the correction value for the respective pixel points corresponding to the target base point.

2. The image processing method according to claim 1, wherein the feature block meets at least one of:
   the shape parameter is indicated as a square; or
   the base point parameter indicates that the base point is at the center of the feature block.

3. The image processing method according to claim 1, wherein the calculating the weight value according to the first value and the second value comprises:
   let the weight value be W, the first value is P, a first weighting coefficient is a, the second value is Q, and a second weighting coefficient is β;

then $W = P \times \alpha + Q \times \beta$, wherein $\alpha + \beta = 1$.

4. The image processing method according to claim 1, wherein prior to the calculating M first Euclidean distances between the first feature block and each of the M second feature blocks, respectively, the method further comprises:
   responsive to that the first feature block exceeds boundary of the first feature map, zeroizing pixel points of the first feature block exceeding boundaries of the first feature map; and
   responsive to that any one of the M second feature blocks exceeds boundary of the second feature map, zeroizing pixel points of the one of the M second feature blocks exceeding boundaries of the second feature map.

5. The image processing method according to claim 1, wherein a size of the original image is same as a size of the style reference image.

6. An image processing apparatus, comprising:
   a processor;
   a memory for storing instructions executable by the processor;
   wherein the processor is configured to:
   input an original image and a style reference image into a convolutional neural network to generate a first feature map of the original image and a second feature map of the style reference image;
   calculate respective correction values for respective pixel points in the first feature map based on the second feature map;
   replace original values of the respective pixel points in the first feature map with the respective correction values to obtain a third feature map; and
   perform a deconvolution process on the third feature map to obtain a processed image;
   wherein in a case that the processor is configured to calculate the respective correction values for the respective pixel points in the first feature map based on the second feature map, the processor is configured to:
   obtain an attribute parameter of a feature block, the attribute parameter comprising: a shape parameter, a size parameter, and a base point parameter;
   take a respective pixel point in the second feature map as a base point, and dividing the second feature map into M second feature blocks according to the attribute parameter, wherein M is an amount of pixel points in the second feature map;
   take a pixel point in the first feature map as a target base point, and obtaining a first feature block of the first feature map according to the attribute parameter;
   calculate M first Euclidean distances between the first feature block and each of the M second feature blocks based on values of pixel points included in the first feature block and each of the M second feature blocks, respectively;
   determine a second Euclidean distance which is shortest among the M first Euclidean distances;

obtain a first value of the pixel point corresponding to the target base point;

obtain a second value of the pixel point corresponding to a base point of one of the M second feature blocks corresponding to the second Euclidean distance;

calculate a weight value according to the first value and the second value; and determine the weight value as the correction value for the pixel point corresponding to the target base point.

7. The image processing apparatus according to claim 6, wherein the feature block meets at least one of:

the shape parameter is indicated as a square; or the base point parameter indicates that the base point is at the center of the feature block.

8. The image processing apparatus according to claim 6, wherein in a case that the process is configured to calculate the weight value according to the first value and the second value, the processor is configured to:

let the weight value be W, the first value be P, a first weighting coefficient be a, the second value be Q, and a second weighting coefficient be $\beta$;

then $W=P\times\alpha+Q\times\beta$, wherein $\alpha+\beta=1$.

9. The image processing apparatus according to claim 6, wherein prior to that the processor is configured to calculate M first Euclidean distances between the first feature block and each of the M second feature blocks, respectively, the processor is further configured to:

responsive to that the first feature block exceeds boundary of the first feature map, zeroize pixel points of the first feature block exceeding boundaries of the first feature map; and responsive to that any one of the M second feature blocks exceeds boundary of the second feature map, zeroize pixel points of one of the M second feature blocks exceeding boundaries of the feature map.

10. The image processing apparatus according to claim 6, wherein a size of the original image is same as a size of the style reference image.

11. A non-transitory computer-readable storage medium, wherein responsive to that an instruction in the storage medium is executed by a processor of a mobile terminal, the mobile terminal is caused to perform an image processing method, comprising:

inputting an original image and a style reference image into a convolutional neural network to generate a first feature map of the original image and a second feature map of the style reference image;

calculating respective correction values for respective pixel points in the first feature map based on the second feature map;

replacing original values of the respective pixel points in the first feature map with the respective correction value to obtain a third feature map; and performing a deconvolution process on the third feature map to obtain a processed image;

wherein the calculating the respective correction values for the respective pixel points in the first feature map based on the second feature map comprises:

obtaining an attribute parameter of a feature block, the attribute parameter comprising: a shape parameter, a size parameter, and a base point parameter;

taking a respective pixel point in the second feature map as a base point, and dividing the second feature map into M second feature blocks according to the attribute parameter, wherein M is an amount of pixel points in the second feature map;

taking a pixel point in the first feature map as a target base point, and obtaining a first feature block of the first feature map according to the attribute parameter;

calculating M first Euclidean distances between the first feature block and each of the M second feature blocks based on values of pixel points included in the first feature block and each of the M second feature blocks, respectively;

determining a second Euclidean distance which is shortest among the M first Euclidean distances;

obtaining a first value of respective pixel points corresponding to the target base point;

obtaining a second value of respective pixel points corresponding to a base point of one of the M second feature blocks corresponding to the second Euclidean distance;

calculating a weight value according to the first value and the second value; and determining the weight value as the correction value for the respective pixel points corresponding to the target base point.

12. A mobile phone implementing the image processing method according to claim 1, wherein the mobile phone is configured to apply features in the style reference image that have been learned through the deconvolution process to the original image, such that the original image is added with the style of the style reference image while keeping content of the original image, thereby realizing image stylization.

13. The mobile phone of claim 12, wherein the feature block meets at least one of:

the shape parameter is indicated as a square; or the base point parameter indicates that the base point is at the center of the feature block.

14. The mobile phone of claim 13, wherein the calculating the weight value according to the first value and the second value comprises:

let the weight value be W, the first value is P, a first weighting coefficient is a, the second value is Q, and a second weighting coefficient is $\beta$;

then $W=P\times\alpha+Q\times\beta$, wherein $\alpha+\beta=1$.

15. The mobile phone of claim 14, wherein prior to the calculating M first Euclidean distances between the first feature block and each of the M second feature blocks, respectively, the method further comprises:

responsive to that the first feature block exceeds boundary of the first feature map, zeroizing pixel points of the first feature block exceeding boundaries of the first feature map; and responsive to that any one of the second feature blocks exceeds boundary of the second feature map, zeroizing pixel points of the one of the M second feature blocks exceeding boundaries of the feature map.

16. The mobile phone of claim 15, wherein a size of the original image is same as a size of the style reference image.

17. The mobile phone of claim 16, wherein the mobile phone comprises a display screen, and the method further comprises displaying the processed image on the display screen.

* * * * *